June 11, 1929.  H. A. CASE  1,716,814

AUXILIARY HAND THROTTLE

Filed June 13, 1928

INVENTOR

Hiram A. Case

Patented June 11, 1929.

1,716,814

UNITED STATES PATENT OFFICE.

HIRAM A. CASE, OF LOS ANGELES, CALIFORNIA.

AUXILIARY HAND THROTTLE.

Application filed June 13, 1928. Serial No. 284,993.

In this specification, and the accompanying drawings, I shall describe and show a preferred form of my invention, and specifically mention certain of its more important objects. I do not limit myself to the forms disclosed, since various changes and adaptations may be made therein without departing from the essence of my invention, as hereinafter claimed; and objects and advantages, other than those specifically mentioned, are included within its scope.

My invention relates to hand throttles used on motor vehicles and an important object of this invention is the application of a hand throttle which is capable of being operated simultaneously with the shifting lever of an automobile or other vehicle of its kind while shifting or separately when not in the act of shifting at the option of the driver.

Such an improvement thus placed in juxtaposition with the shifting lever of an automobile, will enable a driver to keep one foot on the brake which ordinarily would have to be used on the accelerator or foot feed and is of paramount importance in driving grades; in avoiding the use of brakes on steep inclines when shifting in order to speed the engine to synchronize with the speed of the car. It also enables a quick getaway in shifting from a high into an intermediate gear on grade. It is of vast relief when driving in congested traffic where a constant shifting of gears is necessary and is a helpful factor in teaching novices who are not accustomed to propel a car to provide sufficient momentum in carrying it forward during the process of shifting.

These advantages, when viewed with the drawings, will suggest further meritorious features in which Figure 1 is a perspective view of my new hand throttle in relation to well known parts of an automobile, or other similar vehicle as proposed.

Figure 1:
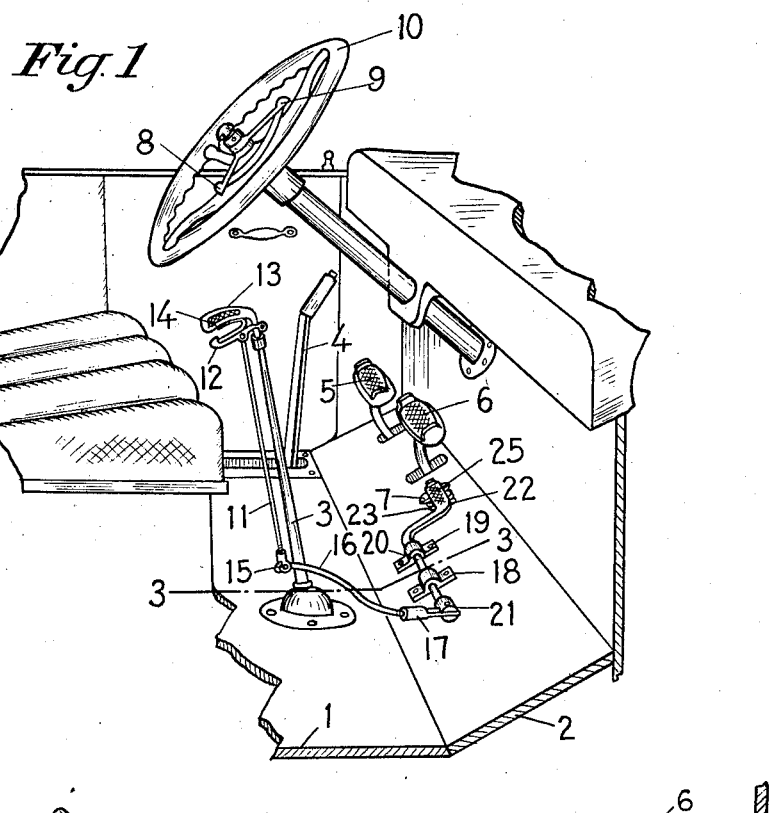
Figure 2:
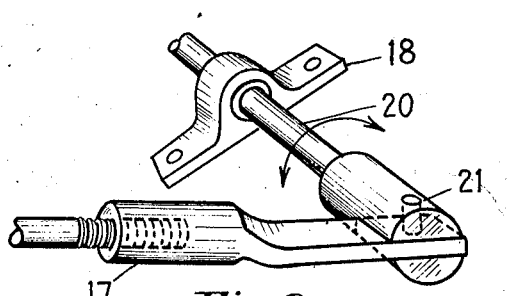
Figure 2 is an enlarged perspective view showing a portion of the means for rotating the shaft which feeds the gas through the medium of the accelerator, as well as an arrangement showing an extensible means which may be employed to facilitate attachment of the device to various makes of cars where the position of the parts to which the device is applicable varies.
Figure 3:
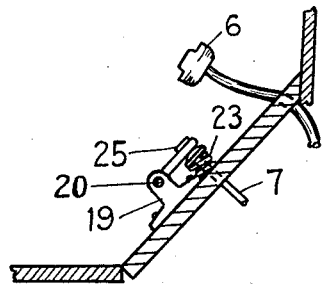
Figure 3 is a section taken on the line 3—3 of Figure 1.

Referring to the drawing, the present improvement in the embodiment illustrated in Figures 1, 2 and 3, is shown as applied to a motor vehicle having a horizontal floor board 1 and an inclined foot board 2.

Projecting through the floor board 1 is a gear shift lever 3 and an emergency brake lever 4, the former being located within reach of the driver, usually, just to the right of the driver and near the center of the floor board. Projecting through the inclined foot board 2 are the usual clutch and brake pedals 5 and 6 respectively. To the right of the brake pedal and within pivotal reach of the heel of one's foot is an accelerator 7, or foot feed control which also projects through the inclined foot board 2 and is in direct contact with the gas feed of a carbureter (not shown).

The foot control or accelerator 7 has heretofore been the only convenient source of introducing gas to the carburetor except that through the hand throttle on the steering wheel. In Figure 1, this means of gas feed is represented by the numeral 8 while the spark lever and steering wheel are indicated by the numerals 9 and 10. The latter mentioned feed is one of the oldest methods used and is well known in the art.

In driving motor vehicles up steep inclines, narrow mountain control roads where hairpin curves and the like are encountered, the motorist is confronted with the difficulty of shifting gears in order to make the grades, and as far as possible, to prevent heating up the engine. When changing the reduction of the speed from an intermediate to a low speed gear, it is often necessary on precipitous grades to bring a car to a state of stand. When occasion arises to do so, the foot ordinarily relied upon to feed gas with the accelerator must be transferred to the brake pedal; at the same time, the right hand is usually occupied with the shifting lever, and all other means of gas feed control are inaccessible. Releasing the foot from the brake before shifting has been accomplished usually sends the car backing down the grade. Oftentimes, this occurs at a hairpin curve wherein a chasm is in close proximity. Fear excites the driver and one is baffled as to what course is expedient. In order to avoid such confusion, it has been found advantageous to provide a hand throttle such as illustrated whereby simultaneous feeding of gas may be made while shifting or as soon as the shifting has been accomplished, or at any other period when it is desired to rest other portions of the body constantly in use. Such provision of an arrangement insures a quick getaway and often prevents stalling the motor.

By this achievement greater ease and comfort are insured in driving in congested traffic, for since the inauguration of four wheel brakes, the quick stopping of motorists makes it necessary for those following in procession to keep the foot in constant readiness to apply the brakes in order to prevent bumping into one another.

In order to accomplish the foregoing results, I provide a rod 11 which is suspended from a pivotal hand grip lever 12 placed near the top of the shifting lever 3 and integral therewith so that said rod 11 hangs suspended substantially parallel with the shifting lever 3. The hand grip lever 12 is in easily grasping position with the top handle portion 13 with the shifting lever 3. A spring member 14 tends to hold the hand grip lever 12 normally apart from the handle 13.

Said rod 11 has at its lower extremity a hinge joint 15 into which is hingedly fastened a connecting lever 16. Said connecting lever 16 has as a part thereof a portion 17 adapted for extension to accommodate the variable distances between the shifting lever and the inclined foot board occurring in the various makes of motor vehicles. One means of accomplishing the result last mentioned is by threading the coupling portion 17 and screwing thereinto the end of the connecting lever 16.

Fastened to the inclined foot board 2 are brackets 18 and 19 and journaled within said brackets is a rock shaft 20. Said rock shaft 20 has at one end a hub 21 into which is fastened the flattened end portion of the coupling member 17, the other end 22 of said rock shaft 20 being flattened and offset in a manner to overlie the foot throttle or accelerator 7. There is a spring 23 between accelerator 7 and the inclined foot board 2 so as to hold accelerator in retractive position. The flattened portion 22 aforementioned has a knurled surface 25 upon which to rest the foot when operating the accelerator in the usual manner, and when the hand grip lever 12 and hand throttle 8 on the steering wheel are not used.

It will be apparent from the foregoing that when it is desired to operate the lever 3 for shifting to different speeds, the handle 13 and lever 12 will be necessarily simultaneously grasped.

In operating the gear shift lever 3, it will be necessary to take hold of both the handle 13 and lever 12, but the latter will not necessarily be actuated. When it is desired to also depress the accelerator, the hand lever 12 may be operated, the rod 11 will thus be elevated causing the rock shaft 20 to rotate in a clockwise direction forcing down the accelerator by the application of the offset portion 22 thereupon. It will be obvious, however, shifting may also be accomplished without going through the procedure last recited. In the foregoing manner, the manipulation of the foot throttle or accelerator may be made effective or ineffective through said mechanism in combination with the shifting of the shifting lever at the option of the driver. On account of the loose link connection 15, the action of the foot on the foot feed will in no manner interfere with the governable positions of the shifting lever 3 because the rod 11 is pivotally supported at its upper end and can therefore be swung in relation to the shifting lever 3.

It is, of course, well understood that in its normal manipulation, the accelerator 7 is depressed by the operator's foot to increase the fuel supply. The same is accomplished in a like manner through the agency of the novel means hereinbefore enumerated.

Having thus set forth the nature of the invention, I claim:

1. In a device of the class described, in combination, a gear shifting lever, an accelerator, a shaft having an offset portion which overlies said accelerator, a hand grip lever mounted upon said gear shifting lever, and means operatively connecting said shaft with said hand grip lever, whereby the manual operation of shifting said gear shifting lever may be accompanied by the manual operation by the same hand of said throttle member.

2. In a device of the character described, the combination with the gear shift lever; of a hand grip lever carried thereby, a rod pivotally suspended from said lever, to be raised and lowered thereby, an accelerator, and means operatively connecting said rod with said accelerator to operate the latter through the raising and lowering of said rod, said means comprising a rock shaft having an offset portion engageable with said accelerator and a connecting lever to connect said rod and shaft.

3. In a device of the character described, the combination with the gear shift lever, of a hand grip lever carried thereby, an accelerator, a spring tending to lift said accelerator, a rock shaft having an offset portion overlying said accelerator and engagable therewith, and a connecting lever to connect said rod and said shaft for the purpose of rocking the latter to contact its offset portion with said accelerator.

4. In a device of the class described, the combination with a manually operable gear shifting lever, a foot board and a foot-actuated throttle member projecting above said foot board, of a shaft having an offset portion which overlies said foot actuated throttle member, a hand grip lever mounted upon said gear shifting lever, and an operative connection between said hand grip lever and said shaft to enable the operator to actuate said throttle member by the hand which is engaging said gear shifting lever.

5. The combination with a gear shifting lever, a foot board and an accelerator, of an actuating rock shaft having an offset portion which overlies said accelerator and extending across said foot board, an operating lever operatively connected therewith, a hand grip lever operatively connected with said gear shifting lever, and means loosely connecting said operating lever with said hand grip lever to permit actuation of said rock shaft by the hand grip lever during the manipulation of shifting said gear shifting lever and free movement of the rock shaft in the same direction when said gear shifting lever remains in shifted position.

6. An auxiliary hand throttle operating mechanism in combination with a gear shifting lever, a foot board and a foot actuated throttle member projecting above said foot board, said auxiliary hand throttle operating mechanism comprising a hand operated grip lever mounted upon said gear shifting lever, a rock shaft having an offset portion which overlies said foot actuated throttle member, means connecting said hand grip lever and said rock shaft to rock said rock shaft whereby to actuate said accelerator when pressure is applied to said hand grip lever, said pressure being exerted simultaneously with the manipulation of the gear shifting lever.

HIRAM A. CASE.